United States Patent [19]

Henley

[11] Patent Number: 4,466,633
[45] Date of Patent: Aug. 21, 1984

[54] ARTICULATED VEHICLE

[76] Inventor: James C. Henley, 7240 S. 7th St., Sp. C44, Phoenix, Ariz. 85040

[21] Appl. No.: 443,377

[22] Filed: Nov. 22, 1982

[51] Int. Cl.³ ............................................. B60D 1/06
[52] U.S. Cl. ..................................... 280/492; 280/724
[58] Field of Search ....................... 280/492, 400, 724; 180/235

[56] References Cited

U.S. PATENT DOCUMENTS

| | | | |
|---|---|---|---|
| 500,212 | 6/1893 | Reynolds | 280/400 |
| 747,531 | 12/1903 | Boyd | 280/100 |
| 914,722 | 3/1909 | Holland et al. | 280/400 |
| 1,272,757 | 7/1918 | Yoder | 180/235 |
| 2,366,166 | 1/1945 | Willock | 280/400 |
| 3,045,774 | 7/1962 | Hadlock | 180/235 |
| 3,115,205 | 12/1963 | Ewing | 180/252 |
| 3,159,299 | 12/1964 | Rawle | 217/43 A |
| 3,360,067 | 12/1967 | Scott | 180/235 |
| 3,437,163 | 4/1969 | Lemmerman | 180/135 |
| 3,568,788 | 3/1971 | Swisher et al. | 180/235 |
| 3,809,176 | 5/1974 | Von Braunschweig | 180/139 |
| 3,862,769 | 1/1969 | Bechman et al. | 280/400 |
| 3,900,212 | 8/1975 | Ewing | 280/492 |
| 3,912,300 | 10/1975 | Bryan | 280/400 |
| 4,050,535 | 9/1977 | Bosshart et al. | 280/400 |
| 4,099,733 | 7/1978 | Ahonen | 280/6.1 |

FOREIGN PATENT DOCUMENTS 250141  9/1926  Italy .................................. 280/724

Primary Examiner—Joseph F. Peters, Jr.
Assistant Examiner—D. Lynn Fugate
Attorney, Agent, or Firm—Don J. Flickinger

[57] ABSTRACT

In an articulated vehicle adapted for street or off-road use, the forward section manufactured on a first A-frame is pivotably coupled by means of a ball and socket to an aft section manufactured on a second A-frame so as to provide pivotable movement between said forward and aft sections about both horizontal and verticle axes. A first shaft is fixedly coupled to the forward section and extends behind the ball and socket and below a second shaft in said aft section. A coil spring suspension system is coupled between the first and second shafts and is adjustable along the lengths thereof so as to vary the degree of softness with which the vehicle will ride.

9 Claims, 10 Drawing Figures

ARTICULATED VEHICLE

FIELD OF THE INVENTION

This invention relates generally to articulated vehicles and, more particularly, to an articulated vehicle for street or offroad use having an improved suspension system.

PRIOR ART

Attempts to construct a vehicle for offroad use over rough terrain have been numerous. However, each of the vehicles have had inherent disavantages. Automobiles of various types have been provided with four-wheel drives to increase traction, but such vehicles are not suitable where the terrain is extremely uneven or the space through which the vehicle must pass is very narrow. Efforts have been directed at manufacturing one-wheeled vehicles which operate on the principle of gyroscopic action, however these suffered from the inherent disavantage that the weight within the vehicle must be evenly distributed, and the resulting vehicle is often of insufficient size to carry more than one or two passengers and little additional equipment or cargo.

The above described disadvantages have been overcome through the use of articulated vehicles which include a chassis comprised of front and rear sections which are interconnected for both lateral movement and rotation with respect to each other. Such a vehicle is shown and described in U.S. Pat. No. 3,360,067 entitled FOUR WHEEL DRIVE ARTICULATED VEHICLE. The vehicle described has front and rear chassis portions which are articulated together for pivotal movement about both vertical and longitudinally horizonal axis. Each chassis portion includes an axle mounting a pair of wheels. A prime mover is mounted on one of the chassis portions and is drivingly connected directly to the axle on that portion and also to the axle of the other portion through a drive shaft having a universal joint at each end and respectively connected to the axles.

The prior art is replete with articulated vehicles in which frame sections are joined for movement in more than one direction. Futhermore, the prior art discloses resilient steering arrangements. Resilient suspension, on the other hand, appears to have received very little notice. Exemplary of sprung suspension is U.S. Pat. No. 4,099,733 entitled OFF-THE-ROAD VEHICLES which describes an articulated vehicle having elastically yieldable axle units associated with the frame sections.

SUMMARY OF THE INVENTION

It is an object of the present invention to provide an improved articulated vehicle for street or off-road use.

It is a further object of the present invention to provide an articulated vehicle for street or off-road use which is equipped with an improved suspension system.

It is a still further object of the present invention to provide a suspension for use on an articulated vehicle which may be simply and manually controlled by the operator so as to provide a ride to the operator's taste regardless of the condition of the road or the load being carried.

Yet another object of the present invention is to provide a suspension system for use on off-road articulated vehicles which causes the vehicle to automatically straighten out when the steering wheel is released.

According to a broad aspect of the invention there is provided in a vehicle of the type wherein there are provided forward and aft sections each equipped with wheels, and pivot means interconnecting said forward and aft sections so as to provide pivotal movement therebetween about horizontal and vertical axes, the improvement comprising first means fixedly coupled to said forward section and extending rearward of said pivot means, and resilient suspension means coupled between said first means and said aft section, said suspension means being manually adjustable so as to vary the degree of softness with which the vehicle will ride.

According to a further aspect of the invention said first means comprises a first shaft extending from the forward section and below a second shaft carried by said aft section. The resilient suspension means, preferably a coil spring which may be assisted by a shock absorber, extends between the shafts.

BRIEF DESCRIPTION OF THE DRAWINGS

The above, and other objects, features and advantages of the present invention will be more clearly understood from the following detailed description taken in conjunction with the accompanying drawings, in which.

DESCRIPTION OF THE PREFERRED EMBODIMENTS

Figure 1:
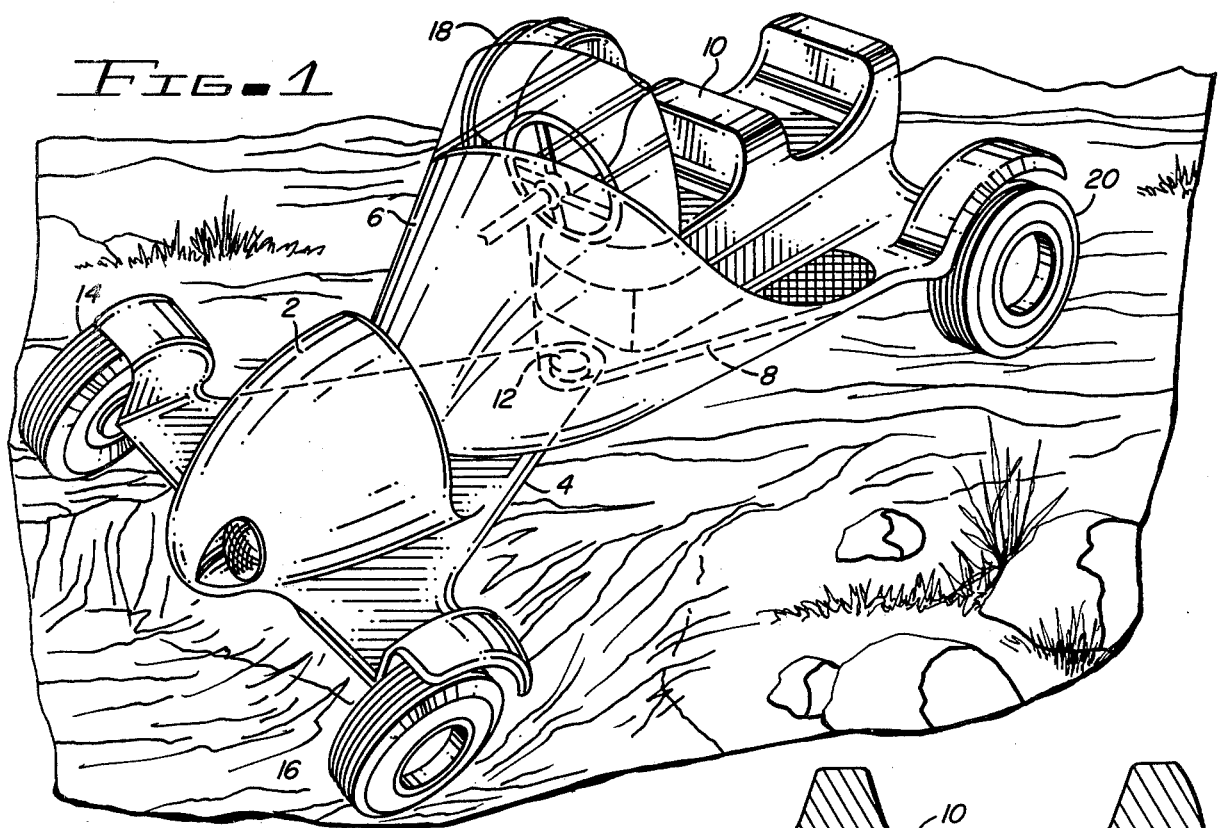
FIG. 1 is a perspective view of an articulated vehicle manufactured in accordance with the present invention.

FIG. 1 is an isometric view of an articulated vehicle manufactured in accordance with the teachings of the present invention. As can be seen, the vehicle comprises a forward section 2 constructed on a first A-frame 4 and an aft section 6 constructed on a second A-frame 8. Forward section 2 includes first and second wheels 14 and 16, and aft section 6 includes rear wheels 18 and 20. Seating means 10 is provided so as to accommodate one or two passengers. It should be clear however that seat 10 may be expanded so as to accommodate more than two passengers. Forward section 2 and aft section 6 are pivotably coupled together at 12 in a manner to be more fully described below. However it should be clear that the vehicle shown in FIG. 1 requires assemblies normally associated with vehicles such as an engine, power train, steering assembly, etc. Such mechanism adapted for use in conjunction with articulated vehicles are well known and reference is made to the above cited U.S. Pat. No. 4,099,733 the teachings of which are hereby incorporated by reference. Thus, a more detailed discussion of these assemblies is not deemed necessary at this time.

Figure 2:
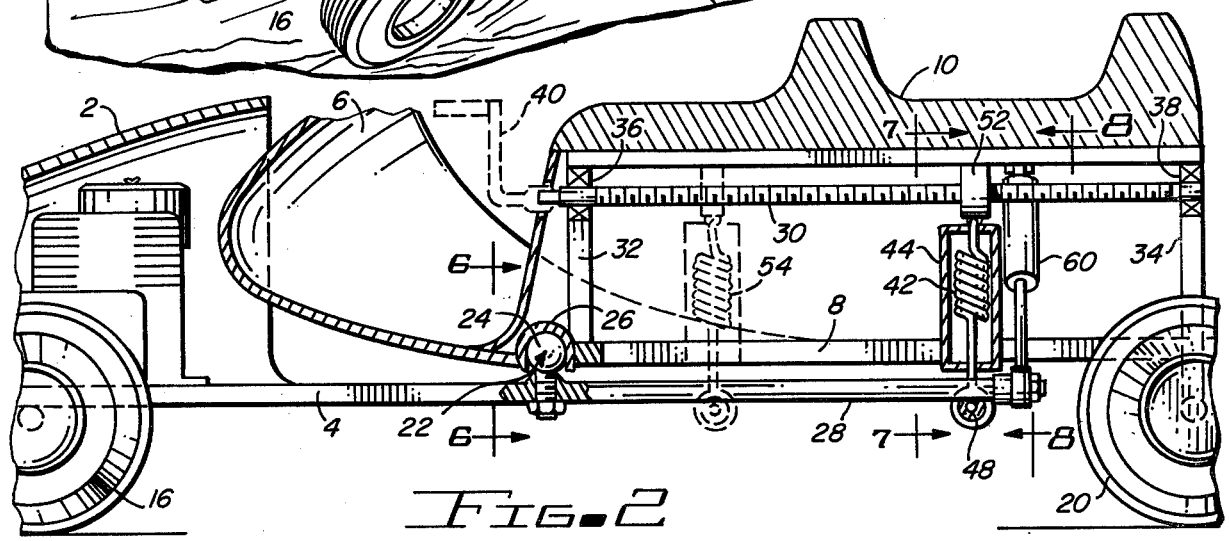
FIG. 2 is a side cross sectional view of the vehicle shown in FIG. 1 illustrating the inventive suspension system.
Figure 5:
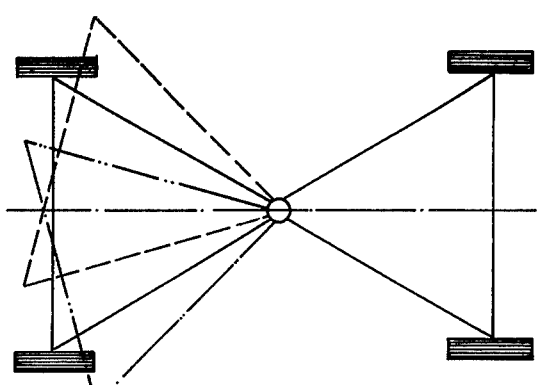
FIG. 5 illustrates how the forward and aft chassis sections of the vehicle shown in FIG. 1 may pivot with respect to each other about a vertical axis.
Figure 6:
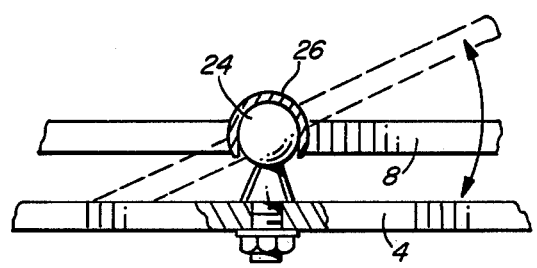
FIG. 6 illustrates how the forward and aft chassis sections of the vehicle shown in FIG. 1 may pivot with respect to each other about a horizontal axis.

Referring now to FIG. 2, it can be seen that frames 4 and 8 are pivotably coupled together by means of a ball joint 22 wherein the ball 24 is fixedly coupled to frame 4 while socket 26 is coupled to frame 8. In this manner, aft section 6 may rotate with respect to forward section 2 about both horizontal and vertical axes so as to accommodate almost any kind of terrain. For example, FIG. 5 illustrates how the forward and aft sections may pivot with respect to each about a vertical axis while FIG. 6 illustrates how frames 4 and 8 may pivot with respect to each other about a horizontal axis.

Referring again to FIG. 2, a rearward extending shaft 28 is fixedly coupled to the forward A-frame 4. A second shaft 30 is coupled for rotation within vertical members 32 and 34 by means of bearings 36 and 38 respectively. A crank handle 40, which may be removable, is coupled to a forward end of shaft 30 for imparting rotation thereto in either direction.

Figure 3:
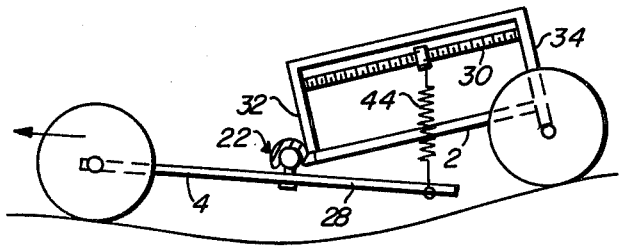
FIGS. 3 and 4 illustrate how the forward and aft chassis sections of the vehicles shown in FIGS. 1 and 2, are pivotably coupled by a ball and socket joint so as to permit the vehicle to accomodate rough terrain.
Figure 4:
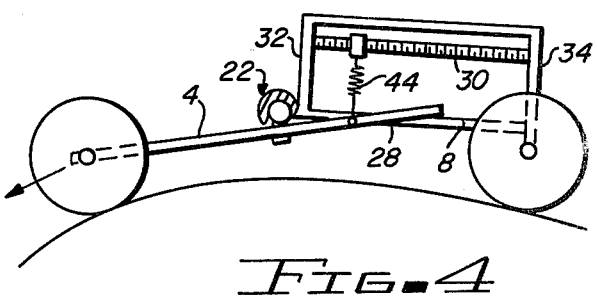
Figure 7:
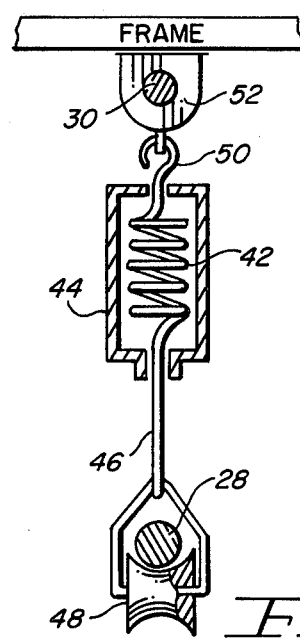
FIG. 7 is a close up view of the inventive suspension system in accordance with a first embodiment.

A spring 42 within housing 44 has a lower end 46 coupled to a roller 48 which is positioned so as to roll along shaft 28 (a more detailed view is shown in FIG. 7). The upper end 50 of spring 42 is coupled to an internally threaded member 52 whose internal threads cooperate with the external threads on rotatable shaft 30. Thus, as handle 40 is rotated in a first direction (e.g. clockwise), internally threaded member 52 will be caused to move towards the forward end of shaft 30. Roller assembly 48 facilitates movement of the entire spring assembly. Rotation of handle 40 may be continued until, for example, the spring assembly reaches a desired position 54. Similarly, the spring assembly may be moved towards the aft end of shaft 30 by rotating handle 40 in a counter-clockwise direction. In this manner, either a hard or soft ride may be achieved depending on terrain and/or operator comfort. For example, FIG. 3 illustrates a case where the position of the spring assembly relatively back on shaft 30 will yield a stiff ride since rotation of the forward section 4 with respect to the aft section 8 about a horizontal axis will cause significant spring displacement. On the other hand, by positioning the spring assembly closer to ball joint 22, as shown in FIG. 4, an equal amount of rotation will result in significantly less spring displacement resulting in a softer ride.

Figure 9:
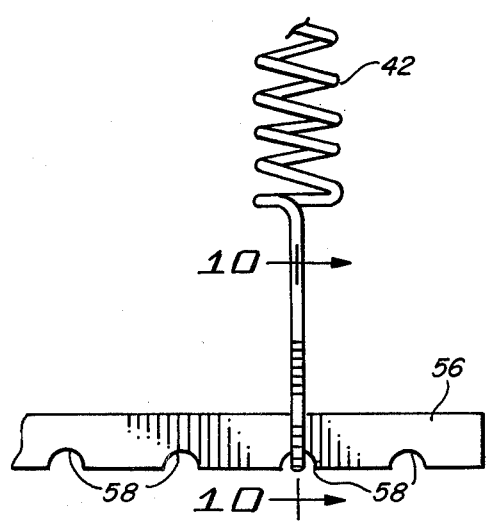
FIGS. 9 and 10 are close up views of the inventive suspension system in accordance with a second embodiment.
Figure 10:
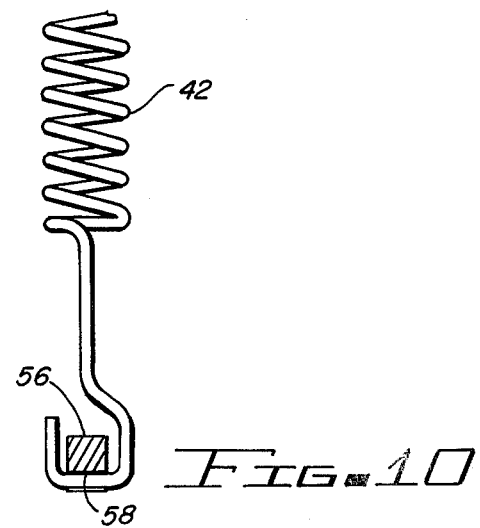

To simplify the arrangement shown in FIG. 2, shafts 28 and 30 may be replaced by notched shafts or bars 56 of the type shown in FIGS. 9 and 10. In this case, neither the upper or lower shaft would be capable of rotation and the positioning of spring 42 is accomplished manually by moving the spring fore or aft. The spring is secured in the desired position since its upper and lower ends engage notches such as are shown at 58 in the upper and lower shafts.

It should be noted that when the fore and aft sections of the vehicle pivot with respect to each other about a vertical axis, there will likewise be displacement of spring 42. This provides directional stability in that the vehicle will automatically straighten out when the steering is released; i.e. spring 42 will urge the forward and aft sections back into alignment.

Figure 8:
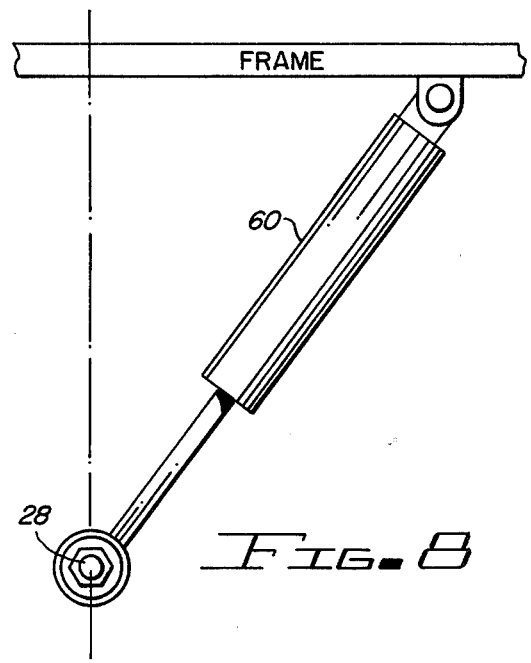
FIG. 8 is a close up view of a shock absorber coupled between the forward and aft chassis sections.

To provide additional comfort, the shock absorber 60 is coupled between shaft 28 and that portion of the rear frame which supports seat 10 as is shown in more detail in FIG. 8. The above description is given by way of example only. Changes in form and detail may be made by one skilled in the art without departing from the scope of the invention as defined by independent claims.

I claim:

1. In a vehicle of the type wherein there are provided forward and aft sections each equipped with wheels, and pivot means interconnecting said forward and aft sections so as to provide pivotal movement therebetween about horizontal and vertical axes, the improvement comprising:
    a first shaft fixedly coupled to said forward section and extending rearward of said pivot means;
    a second shaft coupled to said aft section and disposed above said first shaft when said forward and aft sections are in alignment; and
    resilient suspension means coupled between said first shaft and said second shaft, the stiffness of said suspension means being manually adjustable so as to vary the degree of softness with which the vehicle will ride, said resilient suspension means, when displaced, serving to urge said first and second shafts toward alignment, thereby providing directional stability to said vehicle.

2. A vehicle according to claim 1 wherein said first and second shafts are notched and wherein said resilient suspension means comprises a coil spring having first and second ends each of which are capable of being positioned in notches in said first and second shafts, the softness of the ride increasing as said spring is moved closer to said pivot means.

3. A vehicle according to claim 1 wherein said second shaft is externally threaded and is rotatably coupled within said aft section and further comprising:
    second means for coupling said suspension to said first and second shafts so that said suspension means will move in first and second linear directions when said second shaft is rotated in first and second angular directions respectively.

4. A vehicle according to claim 3 further comprising third means for rotating said second shaft.

5. A vehicle according to claim 4 wherein said third means comprises a crank handle.

6. A vehicle according to claim 5 wherein said crank handle is removable.

7. A vehicle according to claim 4 wherein said suspension means comprises:
    a coil spring having upper and lower ends;
    a roller assembly fixedly coupled to said lower end and mounted for movement along said first shaft; and
    an internally threaded member fixedly coupled to said upper end, the internal threads of said internally threaded member for cooperating with the thread on said second shaft.

8. A vehicle according to claim 1 further comprising shock absorber means coupled between the first shaft and said aft section.

9. A vehicle according to claim 8 wherein said pivot means is a ball and socket joint, the ball being fixedly coupled to said forward section and the socket being fixedly coupled to said aft section.

* * * * *